(12) United States Patent
Ono

(10) Patent No.: US 8,451,296 B2
(45) Date of Patent: May 28, 2013

(54) DISPLAY APPARATUS

(75) Inventor: Tachio Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 12/849,654

(22) Filed: Aug. 3, 2010

(65) Prior Publication Data

US 2011/0032384 A1 Feb. 10, 2011

(30) Foreign Application Priority Data

Aug. 6, 2009 (JP) .................................. 2009-183331
Jul. 9, 2010 (JP) .................................. 2010-156813

(51) Int. Cl.
*G09G 5/00* (2006.01)
*H04N 5/228* (2006.01)
*H04N 5/76* (2006.01)
*H04N 5/222* (2006.01)
*G03B 17/00* (2006.01)

(52) U.S. Cl.
USPC ........... 345/649; 345/619; 345/654; 345/660; 348/222.1; 348/231.3; 348/333.01; 348/333.12; 396/50

(58) Field of Classification Search .................. 345/418, 345/619, 649–654, 660–671, 173; 348/207.99, 348/207.1, 208.99, 208.2, 208.12–208.16, 348/222.1, 231.99–231.9, 239, 333.01–333.12; 396/50–53

See application file for complete search history.

(56) References Cited

U.S. PATENT DOCUMENTS

| | | | |
|---|---|---|---|
| 6,262,769 B1* | 7/2001 | Anderson et al. | 348/333.1 |
| 2003/0052985 A1* | 3/2003 | Oya et al. | 348/333.02 |
| 2004/0141085 A1* | 7/2004 | Nickel et al. | 348/333.11 |
| 2004/0165087 A1* | 8/2004 | Harada | 348/239 |
| 2004/0239792 A1* | 12/2004 | Shibutani et al. | 348/333.12 |
| 2006/0061659 A1* | 3/2006 | Niwa | 348/207.99 |
| 2006/0098186 A1* | 5/2006 | Yumiki | 356/3.07 |
| 2006/0173918 A1* | 8/2006 | Nakase et al. | 707/104.1 |
| 2008/0043032 A1* | 2/2008 | Mamona et al. | 345/582 |
| 2008/0165144 A1* | 7/2008 | Forstall et al. | 345/173 |
| 2008/0239131 A1* | 10/2008 | Thorn | 348/333.01 |
| 2008/0266326 A1* | 10/2008 | Porwal | 345/659 |
| 2009/0002391 A1* | 1/2009 | Williamson et al. | 345/619 |

(Continued)

FOREIGN PATENT DOCUMENTS

| | | |
|---|---|---|
| CN | 200991049 Y | 12/2007 |
| CN | 101276576 A | 10/2008 |
| JP | 2002-23914 A | 1/2002 |

OTHER PUBLICATIONS

U.S. Appl. No. 12/709,244, filed Feb. 19, 2010, Katsuya Nakano.

*Primary Examiner* — Michael Osinski
(74) *Attorney, Agent, or Firm* — Canon U.S.A., Inc. IP Division

(57) ABSTRACT

An apparatus includes a display unit, a classification unit configured to classify a plurality of images into a landscape-oriented image and a portrait-oriented image, a detection unit configured to detect whether the apparatus is in the landscape orientation or in the portrait orientation, and a control unit configured to display a plurality of images in one orientation of the landscape-oriented image and the portrait-oriented image on the display unit in response to an instruction, and thereafter display a plurality of images in the other orientation on the display unit. The control unit determines the orientation of the image to be displayed first based on a detection result upon receiving the instruction.

18 Claims, 12 Drawing Sheets

U.S. PATENT DOCUMENTS

| | | | |
|---|---|---|---|
| 2009/0087510 A1* | 4/2009 | Hakoda et al. | 425/149 |
| 2009/0096910 A1* | 4/2009 | Yasuda et al. | 348/333.01 |
| 2009/0128646 A1* | 5/2009 | Itoh | 348/220.1 |
| 2010/0214319 A1* | 8/2010 | Nakano | 345/652 |

* cited by examiner

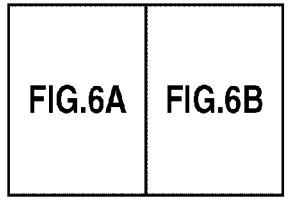
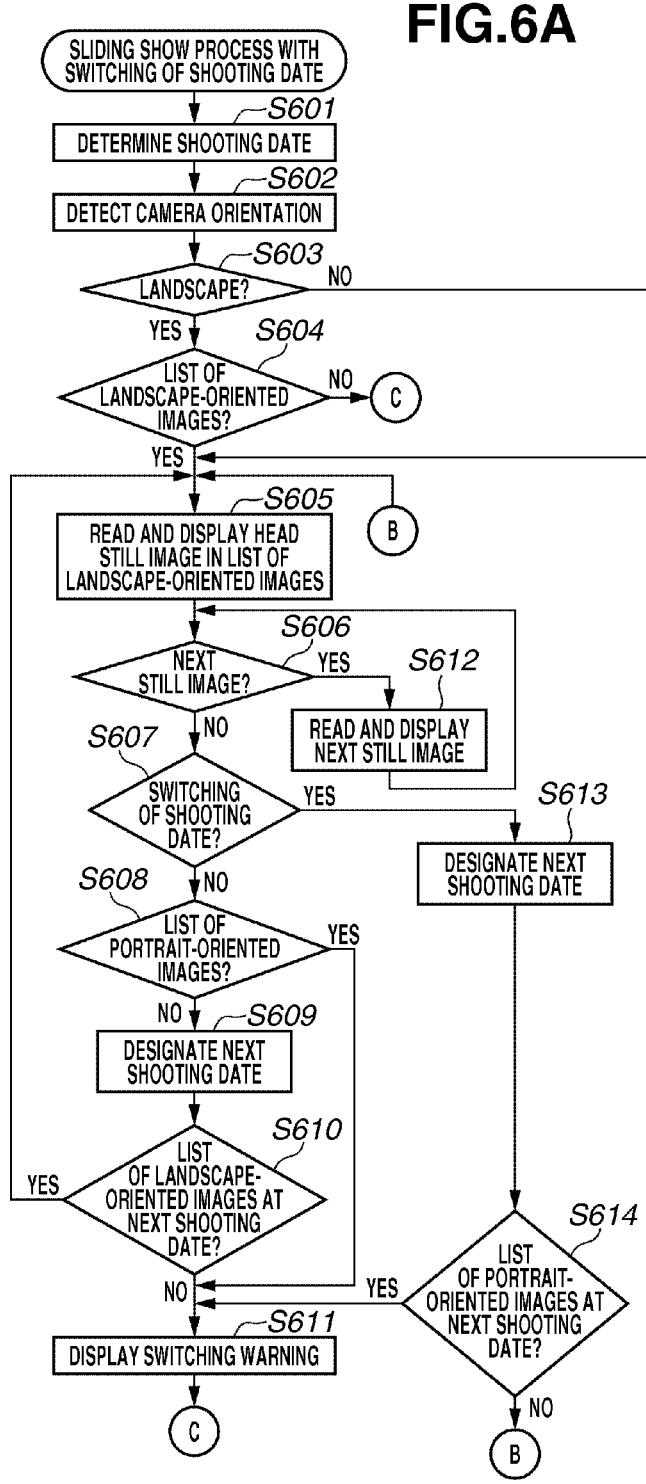
FIG.6A

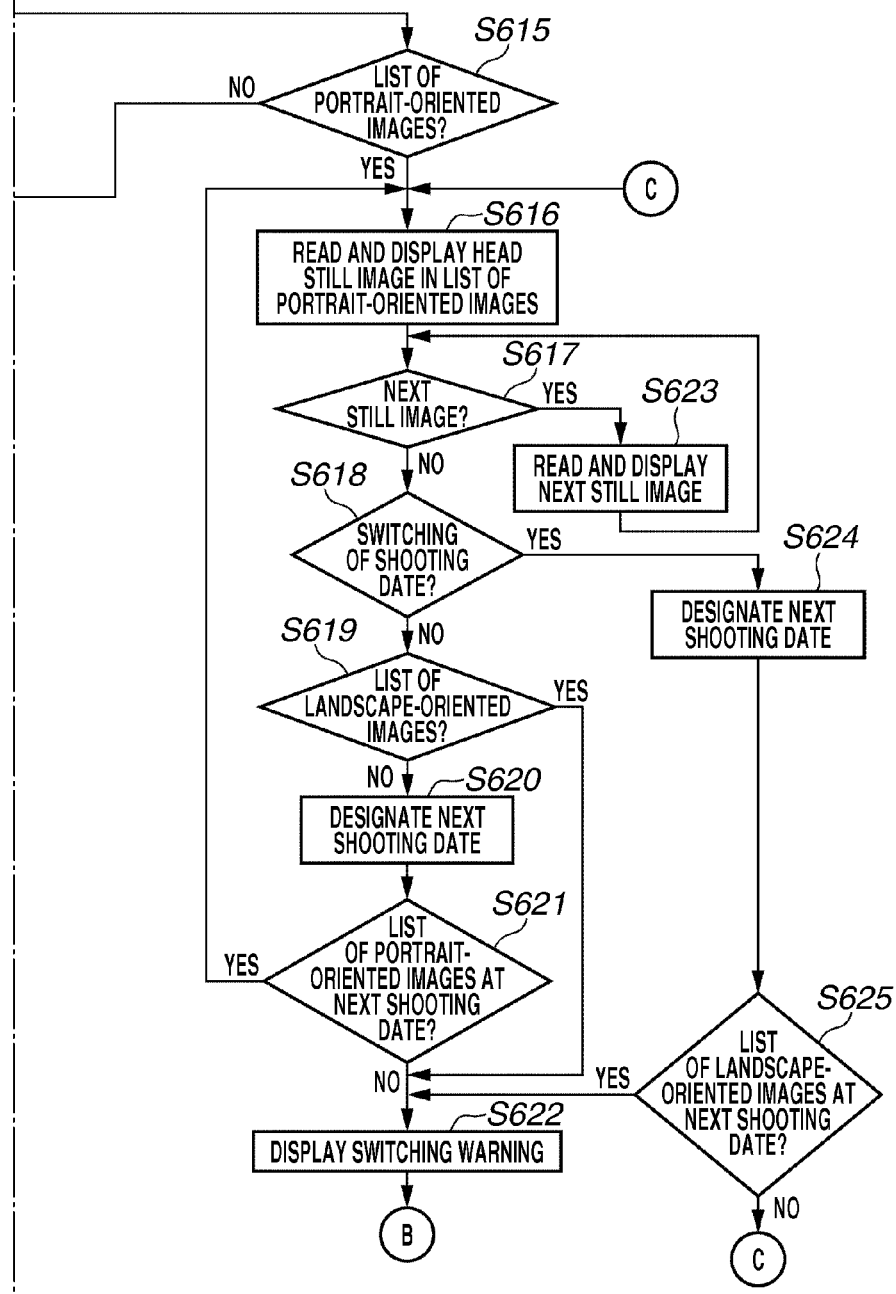

| NO. | ORIENTATION | SHOOTING DATE |
|---|---|---|
| 1 | LANDSCAPE | MAY 1 |
| 2 | LANDSCAPE | MAY 1 |
| 3 | LANDSCAPE | MAY 1 |
| 4 | PORTRAIT | MAY 1 |
| 5 | LANDSCAPE | MAY 1 |
| 6 | PORTRAIT | MAY 1 |
| 7 | PORTRAIT | MAY 1 |
| 8 | LANDSCAPE | MAY 2 |
| 9 | LANDSCAPE | MAY 2 |
| 10 | PORTRAIT | MAY 2 |

802a

| NO. OF LANDSCAPE-ORIENTED IMAGE |
|---|
| 1 |
| 2 |
| 3 |
| 5 |
| 8 |
| 9 |

802b

| NO. OF PORTRAIT-ORIENTED IMAGE |
|---|
| 4 |
| 6 |
| 7 |
| 10 |

803a

| NO. OF LANDSCAPE-ORIENTED IMAGE IN MAY 1 AS SHOOTING DATE |
|---|
| 1 |
| 2 |
| 3 |
| 5 |

803b

| NO. OF PORTRAIT-ORIENTED IMAGE IN MAY 1 AS SHOOTING DATE |
|---|
| 4 |
| 6 |
| 7 |

803c

| NO. OF LANDSCAPE-ORIENTED IMAGE IN MAY 2 AS SHOOTING DATE |
|---|
| 8 |
| 9 |

803d

| NO. OF PORTRAIT-ORIENTED IMAGE IN MAY 2 AS SHOOTING DATE |
|---|
| 10 |

FIG.9
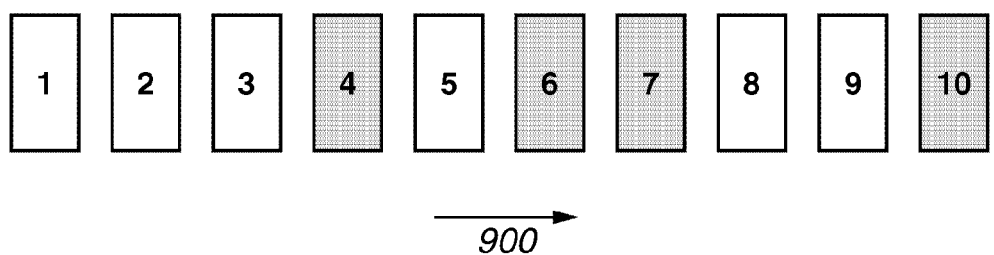
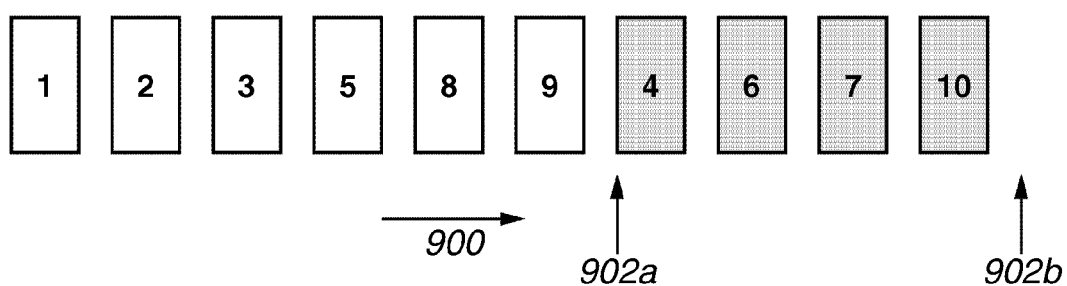
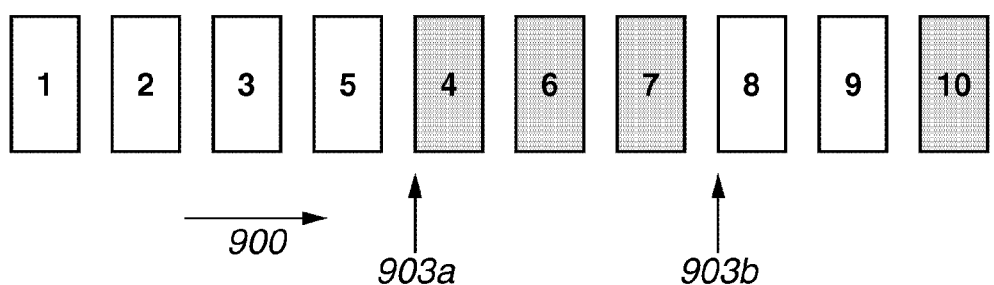

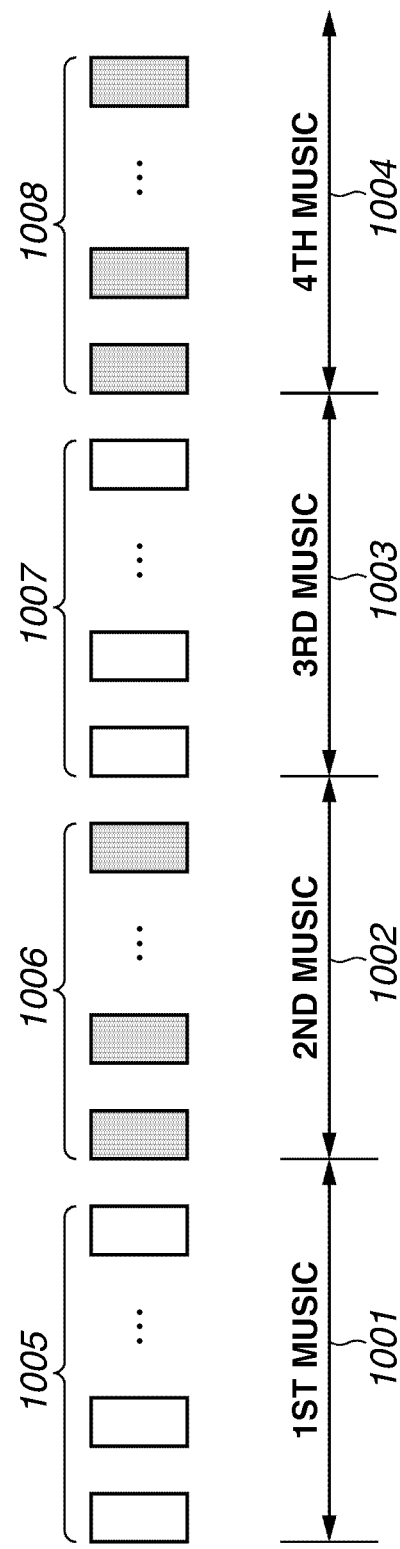

DISPLAY APPARATUS

BACKGROUND OF THE INVENTION

1. Field of the Invention

The present invention relates to a display apparatus and, in particular, to display control of an image.

2. Description of the Related Art

Conventionally, an information terminal such as a mobile phone and a personal digital assistant (PDA) displaying an image read-out from a memory card is well-known, for example, in Japanese Patent Application Laid-Open No. 2002-23914. In addition, a digital camera has a liquid crystal display unit that displays a captured image or a still image reproduced from a recording medium such as a memory card to check the image by a user.

The digital camera generally has a function to, when the digital camera captures a still image, detect the portrait/landscape orientation of the camera and record information indicating the detected portrait/landscape orientation together with the captured still image. Further, the digital camera generally has another function to, when reproducing the recorded still image, detect the portrait/landscape orientation of the camera based on additional information of each image and change the orientation of the display image.

In addition to the digital camera, a mobile terminal has a function to detect the portrait/landscape orientation of an image and automatically change the orientation of the display image.

Recently, the digital camera includes a large multi-pixel liquid crystal display unit. However, the number of pixels of a captured still image is larger than the number of pixels of a camera display unit. Therefore, the camera reduces the size of the captured image or image reproduced from a recording medium and displays the reduced image. When displaying a still image originally-shot in the portrait orientation on a display unit in the landscape orientation, the image is to be further reduced. Thus, a situation occurs, in which the quality of a display image is deteriorated.

When displaying the recorded image, the image can be displayed without changing the orientation thereof and an image larger than that displayed with the change in orientation can be consequently displayed. However, this case is extremely troublesome in that a user is to change the orientation of the digital camera or display apparatus, according to the orientation of the display image.

SUMMARY OF THE INVENTION

According to an aspect of the present invention, an apparatus includes a display unit, a classification unit configured to classify a plurality of images into a landscape-oriented image and a portrait-oriented image, a detection unit configured to detect whether the apparatus is in the landscape orientation or in the portrait orientation, and a control unit configured to display a plurality of images in one orientation of the landscape-oriented images and the portrait-oriented images on the display unit in response to an instruction, and thereafter displays a plurality of images in the other orientation on the display unit, wherein the control unit determines the orientation of the image to be displayed first based on a detection result when the control unit receives the instruction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 (including FIG. 6A and FIG. 6B) is a flowchart illustrating a process of the slide show with switching of a shooting date.

FIG. 8 illustrates states of a list.

FIG. 9 illustrates an order of images displayed in the slide show.

FIG. 10 illustrates another order of images displayed in the slide show.

DESCRIPTION OF THE EMBODIMENTS

Various exemplary embodiments, features, and aspects of the invention will be described in detail below with reference to the drawings.

Figure 1:
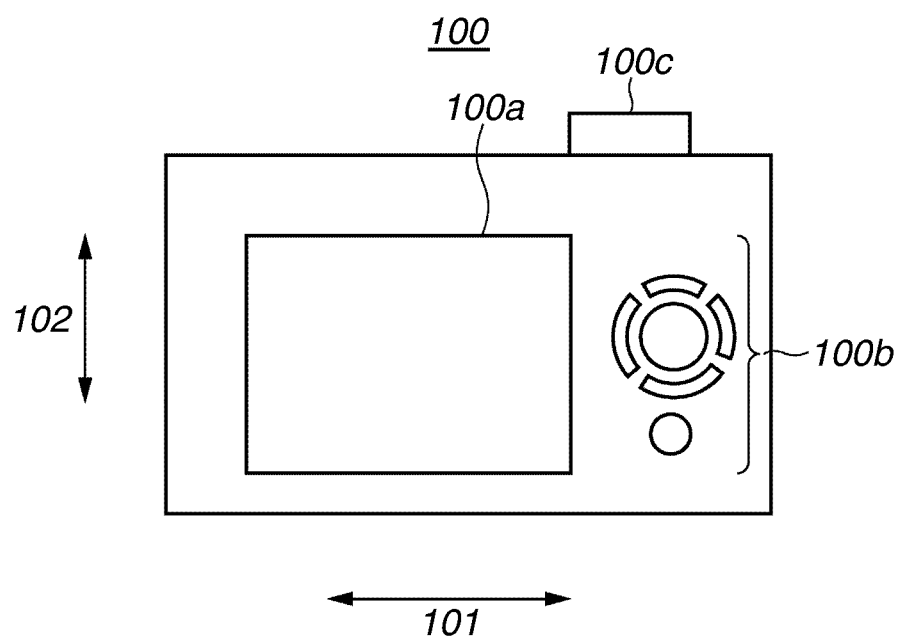
FIG. 1 is an external view of a camera according to an exemplary embodiment of the present invention.

FIG. 1 is a diagram illustrating the appearance of a camera 100 according to an exemplary embodiment of the present invention. FIG. 1 illustrates the side of the camera 100 facing to a user when the user shoots an image with the camera 100. The camera 100 includes a display portion 100a, an operation portion 100b having an orientation button, a determination button, and a menu button, and a shutter button 100c.

Referring to FIG. 1, an arrow 101 illustrates the horizontal direction, and an arrow 102 illustrates the vertical direction. According to the exemplary embodiment, with respect to an image captured in the orientation illustrated in FIG. 1, the length (the number of pixels) in the horizontal direction is longer than the length (the number of pixels) in the vertical direction. Thus, according to the exemplary embodiment, the orientation in FIG. 1 is a landscape one.

The camera 100 includes a mechanism, such as a slot, for freely loading or ejecting a recording medium, e.g., a memory card, by the user. Further, data on a captured still image is recorded on the recording medium, the data such as the recorded still image is read out, and an image on the read-out image data is displayed.

The camera 100 has a gravity sensor that detects the portrait/landscape orientation of the camera 100. The camera 100 controls display operation of the still image at the reproduction time, as will be described later, according to the detected orientation.

Figure 2:
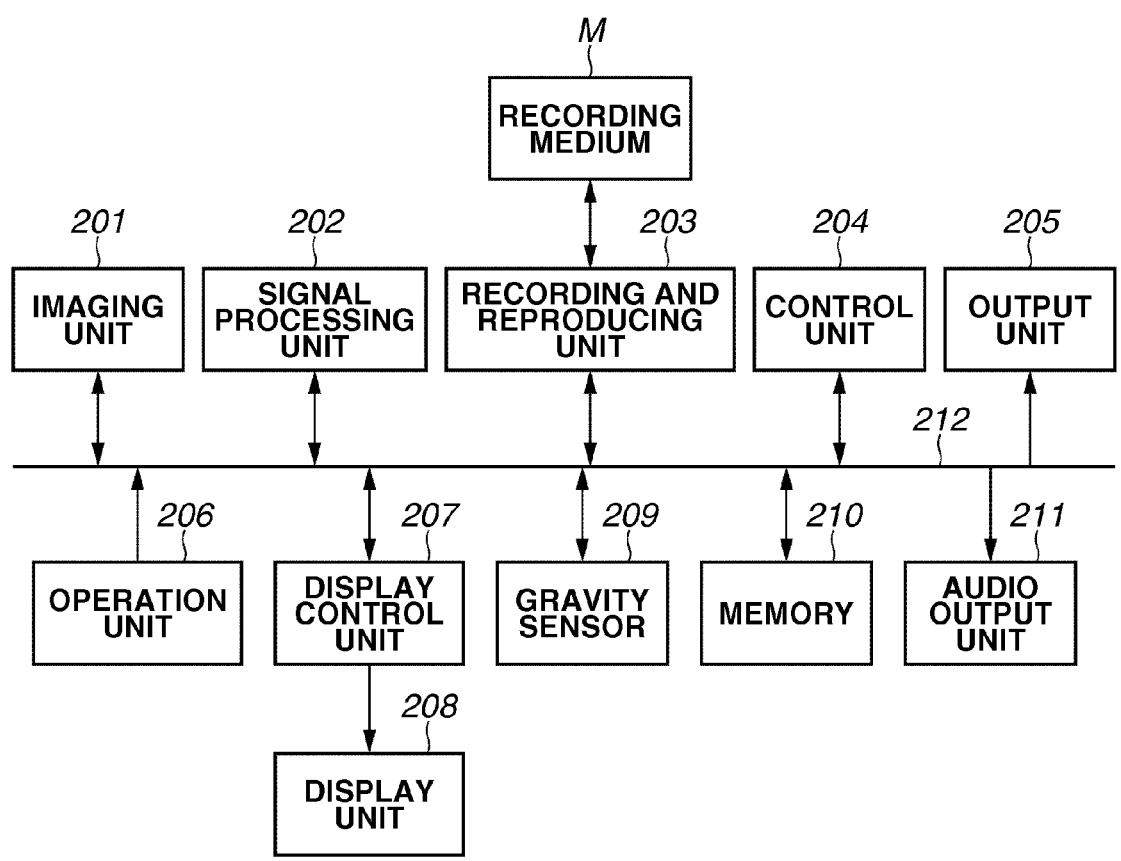
FIG. 2 is a block diagram illustrating a configuration of the camera.

FIG. 2 is a functional block diagram illustrating the internal structure of the camera 100. Referring to FIG. 2, an imaging unit 201 captures an image of an object, and outputs moving image data or still image data. A signal processing unit 202 performs a predetermined process, e.g., compressing and coding, of the captured still image data, decompresses the reproduced still image data, and performs a process for changing the size (the number of pixels) of the reproduced image.

The signal processing unit 202 processes music data for background music (BGM) read-out from a recording medium M, such as a memory card, and outputs the processed data to an audio output unit 211. A recording and reproducing unit 203 records the still image data as a file to the recording medium M, and reproduces the recorded still image file.

A control unit 204 includes a microcomputer and a nonvolatile memory, and controls the operation of the camera 100 by operating the microcomputer according to an operation program stored in the nonvolatile memory. An output unit 205 outputs, to an external display apparatus, the image data captured by the imaging unit 201 or reproduced still image data.

An operation unit 206 includes various operation switches, e.g., a mode switch for switching a power switch or mode, a shutter button, and a menu button. A display control unit 207 generates image data to be displayed on a display unit 208, and displays the generated data on the display unit 208.

The display control unit 207 generates display data indicating various information, e.g., a menu screen as well as the image read-out from the recording medium M in response to an instruction from the control unit 204, and displays the generated data on the display unit 208.

The display unit 208 includes a liquid crystal panel with the size of several inches, and displays an image corresponding to image data for display sent from the display control unit 207. The display unit 208 includes the display portion 100a illustrated in FIG. 1. The number of pixels of the display unit 208 is smaller than the number of pixels of the still image captured by the camera 100.

A gravity sensor 209 detects the portrait/landscape orientation of the camera 100 with a well-known technology, and sends a notification of the detection result to the control unit 204. Specifically, the gravity sensor 209 detects whether the camera 100 is in the portrait orientation or the landscape orientation, and sends a notification indicating the detection result to the control unit 204.

A memory 210 includes a semiconductor memory such as a flash memory, and a hard disk, and stores the image data read-out from the recording medium M. Further, the memory 210 is used for storing various information by the control unit 204.

The audio output unit 211 includes a speaker, and outputs music in a slide show with background music (BGM), which will be described later. A data bus 212 is used for receiving and transmitting various data between blocks.

According to the present exemplary embodiment, the memory card is used as the recording medium M that records the still image data. Obviously, another recording medium can be used as the recording medium M.

Next, a shooting and recording process according to the exemplary embodiment is described below. A power source is turned on by the operation unit 206, and the control unit 204 then instructs the imaging unit 201 to start the shooting. The imaging unit 201 includes a well-known lens, an imaging sensor, and an image processing unit, starts the shooting in response to an instruction from the control unit 204, and outputs the captured image data as a moving image.

The control unit 204 controls the display control unit 207 to display the moving image of the image data output from the imaging unit 201. The display control unit 207 reduces the size of the image data from the imaging unit 201 to match the number of pixels of the display unit 208, and displays the moving image of the captured image data on the display unit 208. The control unit 204 instructs the gravity sensor 209 to detect the orientation.

In this state, a user operates the shutter button of the operation unit 206, and issues an instruction for capturing a still image. Then, the control unit 204 instructs the imaging unit 201 to output the still image data corresponding to one screen in response to the shooting instruction of the still image.

The imaging unit 201 captures and generates the still image data corresponding to one screen in response to the instruction from the control unit 204, and stores the generated data to the memory 210. The signal processing unit 202 performs a predetermined process, such as a coding process, of the still image data stored in the memory 210, and outputs the processed data to the recording and reproducing unit 203.

Further, the control unit 204 generates information indicating the orientation of the captured image based on the output from the gravity sensor 209, and outputs the generated information to the recording and reproducing unit 203. According to the present exemplary embodiment, the control unit 204 outputs binary information indicating whether the image is in the portrait orientation or the landscape orientation. Moreover, the control unit 204 includes a timer, and outputs information indicating the shooting date and time to the recording and reproducing unit 203.

The recording and reproducing unit 203 adds various additional information including information on the orientation of the image from the control unit 204 or information at the shooting date and time to the still image data output from the signal processing unit 202, and records the additional information as a still image file to the recording medium M.

As described above, the user freely changes the orientation of the camera 100 and captures the still image while checking the moving image of the object displayed on the display unit 208.

Next, a process at the reproduction time is described below. First, a process at the normal reproduction time is described. The user operates the operation unit 206 to issue an instruction for reproducing the image. Then, the control unit 204 instructs the recording and reproducing unit 203 to readout one of the still image files recorded on the recording medium M. The still image file read-out at this time is captured just before the operation, however, may be another still image file.

The recording and reproducing unit 203 reads out the still image file, outputs the still image data to the signal processing unit 202, and further outputs the additional information of the still image file to the control unit 204. The control unit 204 detects the orientation of the reproduced image based on information on the orientation of the image included in the additional information and outputs the information on the orientation to the signal processing unit 202. The signal processing unit 202 decodes the reproduced still image data.

The recording and reproducing unit 203 changes the size and orientation of the decoded still image based on the information on the orientation of the image, and outputs the changed image to the display control unit 207. The display control unit 207 displays the still image from the signal processing unit 202 on the display unit 208.

Figure 11A:
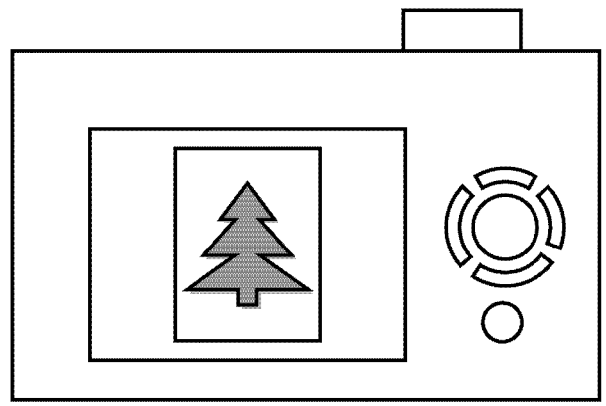
FIGS. 11A to 11C illustrate states of images displayed on the camera.
Figure 11B:
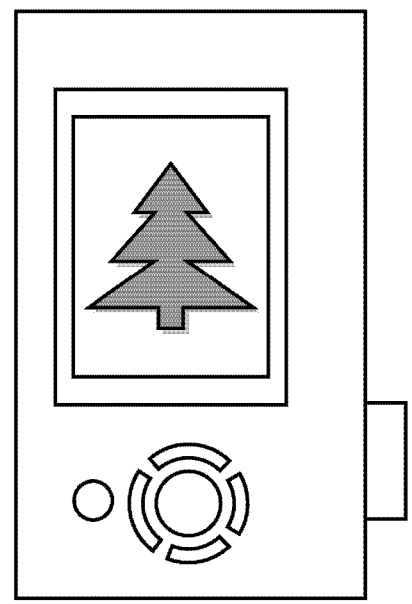

FIG. 11A illustrates a state of the camera 100 when reproducing the still image in the portrait orientation and displaying the still image at the normal reproduction time. Referring to FIG. 11A, the camera 100 is in the landscape orientation, and the length of the image in the portrait orientation is automatically reduced, according to the display portion 100a, and the resultant image is displayed.

On the other hand, when shooting the image in the portrait orientation, the camera 100 can be in a state illustrated in FIG.

11B. Then, the image is displayed without the change in orientation thereof, unlike FIG. 11A, and the image can be displayed corresponding to the display state at the shooting time as illustrated in FIG. 11C.

Figure 11C:
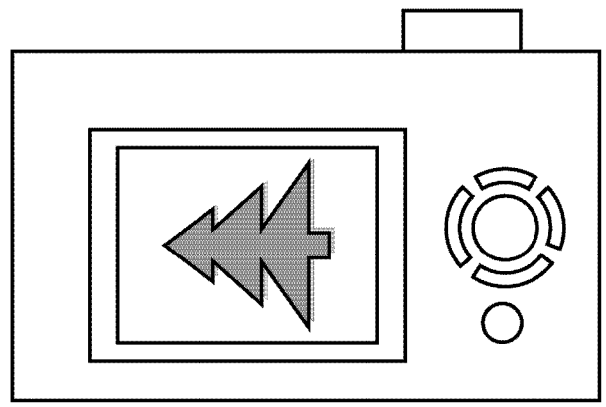

According to the present exemplary embodiment, the image in the portrait orientation is not displayed with the automatic rotation thereof, unlike FIG. 11A, and can be displayed by matching a long side of the image to a long side of the display portion 100a as illustrated in FIG. 11C. The user operates the operation unit 206 to select whether or not the image in the portrait orientation is displayed with the automatic rotation and reduction corresponding to the display portion 100a in the landscape orientation.

The camera 100 has an index display function with which the still image for each screen is not reproduced but reduction images of a plurality of the recorded still images are displayed on one screen. The control unit 204 reads out a plurality of the still image files from the recording medium M at this time, and controls the units to generate the reduction images. Among a plurality of the reduction images displayed on the display unit 208, the control unit 204 reads out the still image selected with the operation unit 206 by the user, and displays the image as described above.

Next, reproduction of the slide show is described. According the present exemplary embodiment, in addition to a normal slide show function for reproducing a plurality of the still image files recorded on the recording medium M at a predetermined interval in a predetermined order, such as the shooting date, the camera 100 has another slide show function.

For example, the camera 100 has a portrait/landscape switching mode for consecutively reproducing the images in the same orientation of the portrait and landscape orientations and a shooting-date switching mode for consecutively reproducing the images in the same orientation of the portrait and landscape orientations from the images having the same shooting date. Further, according to the exemplary embodiment, the camera 100 has a BGM switching mode for consecutively reproducing the images in the same orientation of the portrait and landscape orientations, corresponding to music data of BGM that is recorded on the recording medium M in advance.

Figure 3:
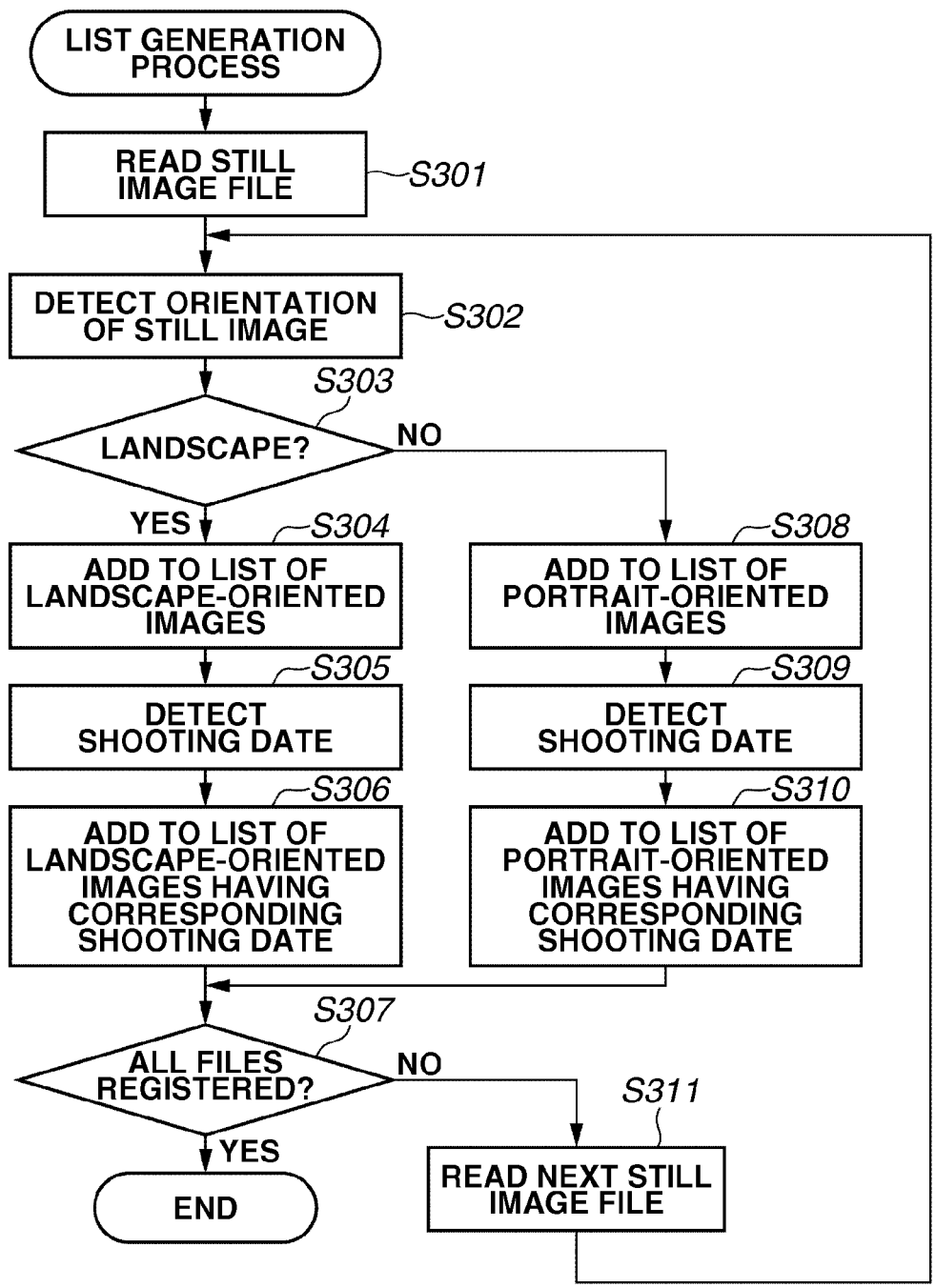
FIG. 3 is a flowchart illustrating a list generation process.

First of all, a list generation process is described, which is used for reproducing the slide show. FIG. 3 is a flowchart illustrating the list generation process. The process illustrated in FIG. 3 is executed by the control unit 204 controlling each unit. According to the present exemplary embodiment, the power source of the camera 100 is turned on, the control unit 204 then executes the process in FIG. 3, and the memory 210 stores information on the generated list.

However, the control unit 204 can execute the list generation process at another timing, e.g., after switching to the reproduction mode or when issuing an instruction of the slide show. Further, when additionally capturing and recording an image after generating the list once, the additionally-captured still image is added to the corresponding list in response to the additional capturing of the image.

In step S301, the recording and reproducing unit 203 reads out one still image file from the recording medium M, and transmits the additional information to the control unit 204. In step S302, the control unit 204 detects the portrait/landscape orientation of the reproduced still image based on the additional information.

When the still image is in the landscape orientation (YES in step S303), in step S304, the control unit 204 adds the still image to the list of the landscape-oriented images. Since the first still image file does not include any lists, the control unit 204 generates the list of the landscape-orientend images, and stores the generated list to the memory 210. Further, the memory 210 individually stores identification information for identifying the still image files, such as a file name (file number) of the reproduced still image file to the list of the landscape-oriented images and the list of the portrait-oriented images.

In step S305, the control unit 204 detects the shooting date of the reproduced still image based on the additional information. In step S306, the control unit 204 adds the still image to the list of the landscape-oriented images at the shooting date. Since the first still image file does not include any lists, the control unit 204 generates the list of the landscape-oriented images at the detected shooting date, and stores the generated list to the memory 210. The memory 210 individually stores identification information for identifying the still image files, such as a file name (file number) of the reproduced still image file, to the list of the landscape-oriented images and the list of the portrait-oriented images.

In step S307, the control unit 204 determines whether or not all still image files recorded on the recording medium M are registered to the lists. When all still image files recorded on the recording medium M are registered to the lists (YES in step S307), the control unit 204 ends the process. When all still image files recorded on the recording medium M are not registered to the lists (NO in step S307), in step S311, the recording and reproducing unit 203 reads out the next still image file from the recording medium M, and the processing returns to step S302.

On the other hand, when the still image is not in the landscape orientation (NO in step S303), in step S308, the control unit 204 adds the still image to the list of the portrait-oriented images. Since the first still image file does not include any lists, the control unit 204 generates the list of the portrait-oriented images and stores the generated list to the memory 210. Further, the memory 210 individually stores identification information for identifying the still image files as described above.

In step S309, the control unit 204 detects the shooting date of the reproduced still image based on the additional information. In step S310, the control unit 204 adds the still image to the list of the portrait-oriented images at the corresponding shooting date. Since the first still image file does not include any lists, the control unit 204 generates the list of the portrait-oriented images at the detected shooting date and stores the generated list to the memory 210. Further, the memory 210 stores identification information for identifying the still image files to the list of the landscape-oriented images and the list of the portrait-oriented images as described above.

FIG. 8 illustrates states of the lists that are generated as described above and are stored in the memory 210. Referring to FIG. 8, a list 801 illustrates a number, orientation, and shooting date of the still image file recorded on the recording medium M. The list 801 illustrates the recording of ten still image files as an example. Further, the list 801 illustrates that seven still images are captured in May 1st, and the orientations thereof are in order of the landscape, landscape, landscape, portrait, landscape, portrait, and portrait. In addition, the list 801 illustrates that three still images are captured in May 2nd, and the orientations thereof are in order of the landscape, landscape, and portrait.

A list 802a illustrates the list of the landscape-oriented images that is generated based on the ten still images in the list 801. The numbers of the still images as the landscape-oriented images are described in the list 802a among the ten still images illustrated in the list 801. Further, a list 802b illustrates the list of the portrait-oriented images generated based on the ten still images illustrated in the list 801. The numbers of the still images as the portrait-oriented images are described in the list 802*b* among the ten still images illustrated in the list 801.

Lists 803*a* and 803*c* illustrate lists of the landscape-oriented images at the individual shooting dates, generated based on the ten still images in the list 801. The numbers of the still images as the landscape-oriented images having the shooting date of May 1st is described in the list 803*a* among the ten still images illustrated in the list 801. Further, the numbers of the still images as the landscape-oriented images having the shooting date of May 2nd are described in the list 803*c* among the ten still images illustrated in the list 801.

Lists 803*b* and 803*d* illustrate lists of the portrait-oriented images at the individual shooting dates, generated based on the ten still images in the list 801. The numbers of the still images as the portrait-oriented image having the shooting date of May 1st is described in the list 803*b* among the ten still images illustrated in the list 801. Further, the numbers of the still images as the portrait-oriented image having the shooting date of May 2nd is described in the list 803*d* among the ten still images illustrated in the list 801.

Figure 4:
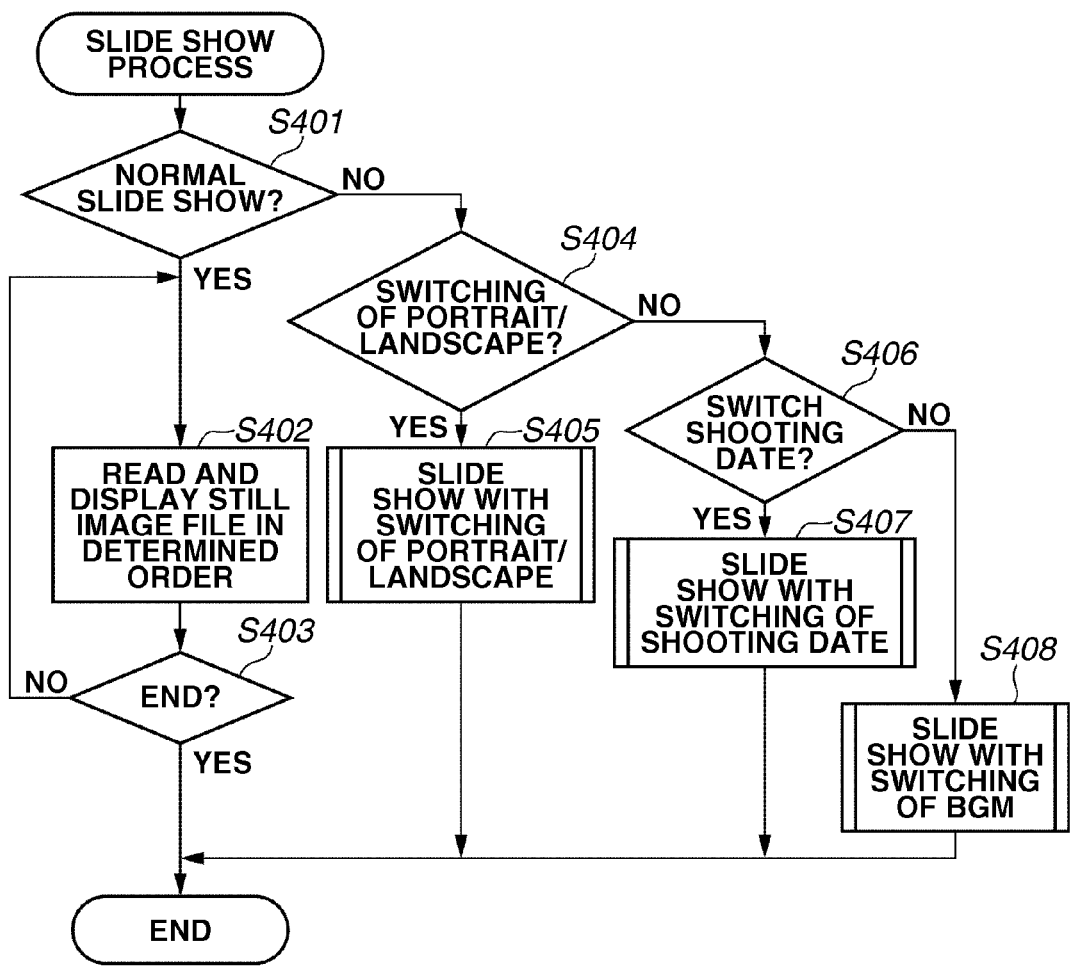
FIG. 4 is a flowchart illustrating a process for reproducing a slide show.

Next, reproduction of the slide show is described with reference to a flowchart in FIG. 4. The user operates the operation unit 206 to select a mode of the slide show, and issues an instruction to reproduce the slide show. Then, a process in FIG. 4 starts. The control unit 204 controls each the unit, thereby executing the process in FIG. 4.

In step S401, the control unit 204 determines whether or not the normal slide show is performed. When the normal slide show is performed (YES in step S401), in step S402, the control unit 204 controls each unit to reproduce the still image files from the recording medium M in predetermined order, and displays the reproduced files on the display unit 208.

The display unit 208 displays one still image for a predetermined time period (several sec), and the control unit 204 then reproduces and displays the next still image. When the control unit 204 detects the orientation of the still image and the image is in the portrait orientation, the control unit 204 automatically rotates the orientation and displays the resultant image as illustrated in FIG. 11A. When the user issues an instruction to end the slide show (YES in step S403), the control unit 204 ends the process.

When the normal slide show is not performed (No in step S401), in step S404, the control unit 204 determines whether or not an instruction is issued to reproduce the slide show with the switching of the portrait/landscape. When the instruction is issued to reproduce the slide show with the switching of the portrait/landscape (YES in step S404), in step S405, the control unit 204 executes a process of the slide show with the switching of the portrait/landscape. The slide show with the switching of the portrait/landscape is described below.

When the instruction is not issued to reproduce the slide show with the switching of the portrait/landscape (NO in step S404), in step S406, the control unit 204 determines whether or not an instruction is issued to reproduce the slide show with the switching according to the shooting date. When the instruction is issued to reproduce the slide show with the switching according to the shooting date (YES in step S406), in step S407, the control unit 204 executes the process of the slide show with the switching according to the shooting date. The slide show with the switching according to the shooting date is described below.

When the instruction is not issued to reproduce the slide show with the switching according to the shooting date (NO in step S406), in step S408, the control unit 204 executes a process of the slide show with the switching of the BGM. The slide show with the switching of the BGM is described below.

Figure 5:
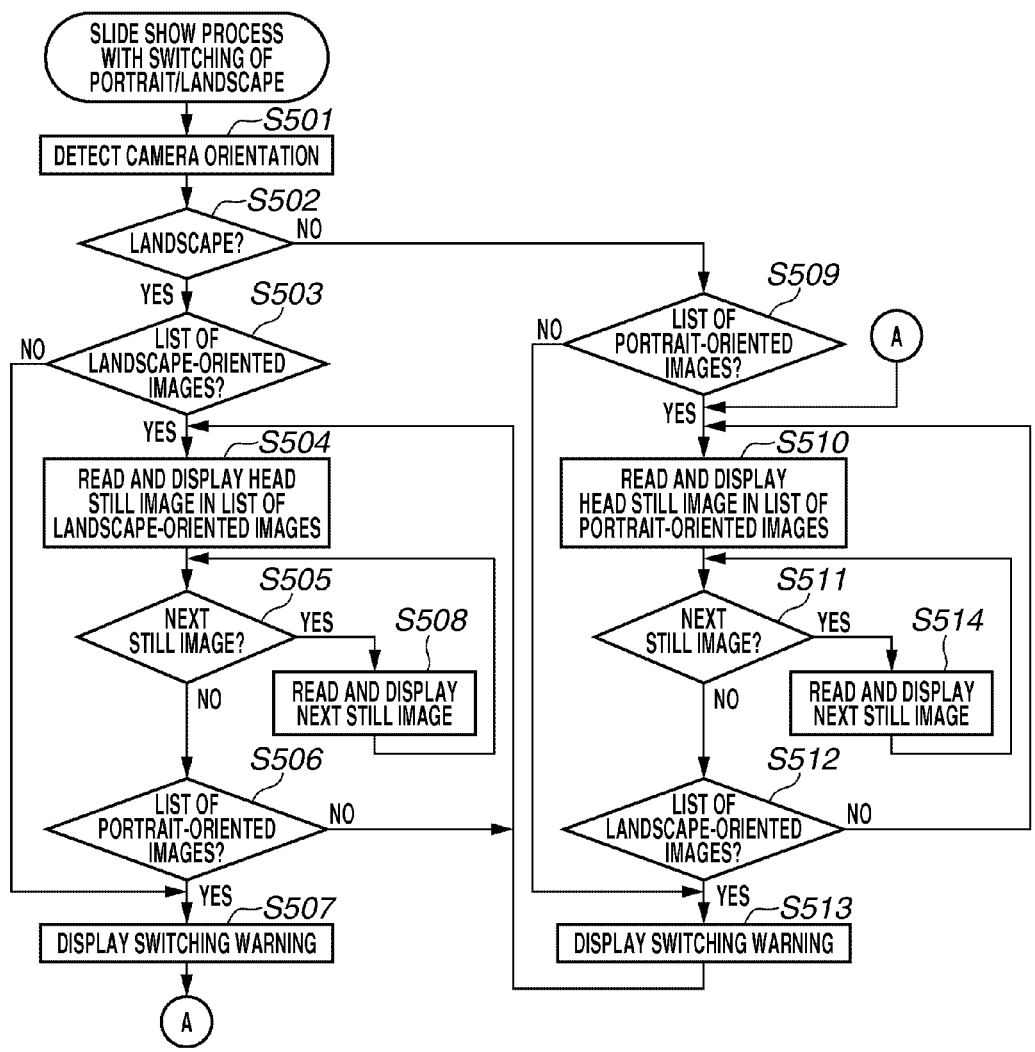
FIG. 5 is a flowchart illustrating a process of the slide show with switching of portrait/landscape.

Next, The process of the slide show with the switching of the portrait/landscape performed in step S405 is described. FIG. 5 is a flowchart illustrating the process (changing the portrait/landscape order) of the slide show with the switching of the portrait/landscape. In the process illustrated in FIG. 4, when the user operates the operation unit 206 to issue an instruction to end the process of the slide show, the control unit 204 then ends the process.

In step S501, the control unit 204 first detects the orientation of the camera 100 based on the output of the gravity sensor 209. In step S502, the control unit 204 determines whether or not the camera 100 is in the landscape orientation. When the camera 100 is in the landscape orientation (YES in step S502), in step S503, the control unit 204 determines whether or not the memory 210 stores the list of the landscape-oriented images.

When the memory 210 stores the list of the landscape-oriented images (YES in step S503), in step S504, the control unit 204 detects the number of the head still image in the stored list of the landscape-oriented images, and reproduces and displays the still image. In step S505, the control unit 204 checks whether or not the next still image is described in the list of the landscape-oriented images. When the next still image is described in the list of the landscape-oriented images (YES in step S505), in step S508, the control unit 204 reads-out the next still image from the recording medium M after a predetermined time, and displays the read still image on the display unit 208.

The display unit 208 displays the still image without changing the orientation of the display image at this time. When the display unit 208 displays the last still image described in the list of the landscape-oriented images in the slide show (NO in step S505), in step S506, the control unit 204 determines whether or not the memory 210 stores the list of the portrait-oriented images.

When the memory 210 does not store the list of the portrait-oriented images (NO in step S506), the processing returns to step S504, and the control unit 204 reads out the head still image in the list of the landscape-oriented images again, and displays the read still image on the display unit 208. When the memory 210 does not store the list of the portrait-oriented images, the recording medium M records only the landscape-oriented image. Therefore, only the landscape-orientated image is repeatedly reproduced in the slide show.

When the memory 210 stores the list of the portrait-oriented images (YES in step S506), in step S507, the display control unit 207 displays warning information for changing the display image to be portrait-oriented on the display unit 208.

When the memory 210 does not store the list of the landscape-oriented images (NO in step S503), in step S507, the display control unit 207 displays warning information for changing the display image to be portrait-orientated on the display unit 208.

Then the processing proceeds to step S510. In step 510, the control unit 204 reads out the head still image in the list of the portrait-oriented images and displays the read still image on the display unit 208. In step S511, the control unit 204 checks whether or not the next still image is described in the list of the portrait-oriented images. When the next still image is described in the list of the portrait-oriented images (YES in step S511), in step S514, the control unit 204 reads out the next still image from the recording medium M after the passage of a predetermined time, and displays the read still image on the display unit 208. At this time, the display unit 208 displays the read still image without changing the orientation of the display image.

When the control unit 204 displays the last still image described in the list of the portrait-oriented images in the slide show (NO in step S511), in step S512, the control unit 204 determines whether or not the memory 210 stores the list of the landscape-oriented images.

When the memory 210 does not store the list of the landscape-oriented images (NO in step S512), the processing returns to step S510. In step S510, the control unit 204 reads out the head still image in the list of the portrait-oriented images and displays the read-out image. When the memory 210 stores the list of the landscape-oriented images (YES in step S512), in step S513, the display control unit 207 displays warning information for changing the display image to be landscape-oriented on the display unit 208. Then, the processing returns to step S504.

When the camera 100 is not in the landscape orientation (NO in step S502), in step S509, the control unit 204 determines whether or not the memory 210 stores the list of the portrait-oriented images. When the memory 210 stores the list of the portrait-oriented images (YES in step S509), the processing proceeds to step S510, and the control unit 204 executes the above-described process.

When the memory 210 does not store the list of the portrait-oriented images (NO in step S509), in step S513, the display control unit 207 displays warning the information for changing the display image to be landscape-oriented on the display unit 208. Then, the processing proceeds to step S504, and the control unit 204 repeats the above-described process.

FIG. 9 illustrates states when the ten still images recorded in the recording medium M in the slide show is reproduced based on the list in FIG. 8. A still image group 901 in FIG. 9 illustrates a state of the still images that are displayed when the normal slide show is reproduced. A still image group 902 illustrates a state of the still images that are displayed when the slide show with the switching of the portrait/landscape is reproduced. Referring to FIG. 9, still images 4, 6, 7, and 10 of the still images are portrait-oriented and are displayed in the order from the left in FIG. 9, as illustrated by an arrow 900.

At the reproducing time of the normal slide show, as illustrated by the still image group 901, the still images are displayed in the shooting order. As illustrated in FIG. 11A, the still images of 4, 6, 7, and 10 are rotated in the orientation at this time, and are reduced in the portrait orientation corresponding to the length of the display unit 208 and are then displayed.

At the start time for reproducing the slide show with the switching of the portrait/landscape, the still images are reproduced in the order illustrated in the lists 802a and 802b in FIG. 8. When the camera 100 at the start time of the reproduction is landscape-orientated, the images in the landscape orientation are first consecutively reproduced in the order of still images 1 to 3, 5, 8, and 9 of the still images according to the list 802a, as illustrated in the still image group 902.

Thereafter, the still images in the portrait orientation are first consecutively reproduced in order of the still images 4, 6, 7, and 10 according to the list 802b. During reproducing the slide show, at switching timings 902a and 902b of the landscape-oriented image and the portrait-oriented image, the display control unit 207 displays warning information for changing the image orientation for a predetermined period on the display unit 208.

At the reproduction time of the slide show with the switching of the portrait/landscape, the recorded still images are classified for each orientation. The reproduction order is rearranged to consecutively reproduce only the landscape-oriented images or the portrait-oriented images. Therefore, even if displaying the image in the portrait orientation without the rotation of the orientation, the user may not need to frequently change the orientation of camera 100.

Further, depending on the orientation of the camera 100 at the start time for reproducing the slide show, it is switched whether the image landscape-oriented or the image portrait-oriented is first reproduced. Therefore, the user can change the orientation of the camera 100 at the timing for changing the orientation of the display image.

Even if the user changes the orientation of the camera 100 during reproduction of the slide show with the switching of the portrait/landscape, according to the present exemplary embodiment, the image is displayed without rotating the orientation thereof.

According to the present exemplary embodiment, after displaying the switching warning in step S507 or S513, the image is automatically switched to the portrait-oriented image or the landscape-oriented image, and is then displayed. Alternatively, after displaying the switching warning in step S507, the switching warning may be continuously displayed until the control unit 204 detects that the camera 100 is switched to be portrait-oriented. In response to the fact that the control unit 204 detects that the camera 100 is portrait-oriented, the processing proceeds to step S510, and the portrait-oriented image is displayed.

Alternatively, the switching warning may be continuously displayed until the control unit 204 detects that the camera 100 is switched to be landscape-oriented after displaying the switching warning in step S513. In response to the fact that the control unit 204 detects that the camera 100 is landscape-oriented, the processing proceeds to step S504, and the landscape-oriented image is displayed.

Next, the slide show process with the switching according to the shooting date performed in step S407 is described. FIG. 6 (including FIG. 6A and FIG. 6B) is a flowchart illustrating the slide show process with the switching according to the shooting date. In the process in FIG. 6, the control unit 204 ends the slide show process when the user issues an instruction for ending the process with the operation unit 206.

In step S601, the control unit 204 determines a shooting date in the lists made for each shooting date stored in the memory 210. In step S602, the control unit 204 detects the orientation of the camera 100 based on the output from the gravity sensor 209. In step S603, the control unit 204 determines whether or not the camera 100 is in the landscape orientation.

When the camera 100 is in the landscape orientation (YES in step S603), in step S604, the control unit 204 determines whether or not the memory 210 stores the list of the landscape-oriented images having the determined shooting date. When the memory 210 stores the list of the landscape-oriented images having the determined shooting date (YES in step S604), in step S605, the control unit 204 detects the number of the head still image, and reproduces and displays the still image.

In step S606, the control unit 204 checks whether or not the next still image is described in the list of the landscape-oriented images. When the next still image is described in the list of the landscape-oriented images (YES in step S606), in step S612, the control unit 204 reads out the next still image from the recording medium M after the passage of a predetermined time, and displays the read-out still image on the display unit 208.

When the last still image described in the list of the landscape-oriented image is displayed in the slide show (NO in step S606), in step S607, the control unit 204 determines whether or not the list is switched to that having the next shooting date. According to the present exemplary embodiment, when the still images described in the list of the landscape-oriented images and the list of the portrait-oriented images having the same shooting date is ended to be displayed, the list is switched to that having another shooting date.

In the present exemplary embodiment, the landscape-oriented images are first displayed, and the shooting date is not switched. When the shooting date is switched (YES in step S607), in step S613, another shooting date is designated in the lists stored in the memory 210. The shooting date is designated from the older one in the ascending order.

When the shooting date is not switched to the next, in step S608, the control unit 204 determines whether or not the memory 210 stores the list of the portrait-oriented images having the same shooting date. When the memory 210 does not store the list of the portrait-oriented images having the same shooting date (NO in step S608), in step S609, the control unit 204 designates the next shooting date. In step S610, the control unit 204 determines whether or not the memory 210 stores the list of the landscape-oriented images having the next shooting date.

When the memory 210 stores the list of the landscape-oriented images at the next shooting date (YES in step S610), the processing returns to step S605, and the control unit 204 reads out the head image in the list of the landscape-oriented images at the next shooting date and displays the read-out image.

When the memory 210 does not store the list of the portrait-oriented images (NO in step S608) or when the memory 210 does not store the list of the landscape-oriented images having the next shooting date (NO in step S610), in step S611, the display unit 208 displays warning information for changing the display image to be portrait-oriented.

In step S616, the control unit 204 detects the number of the head still image in the list of the portrait-oriented images at the determined shooting date of the lists stored in the memory 210 at this time, and reproduces and displays the still image. In step S617, the control unit 204 checks whether or not the next still image is described in the list of the portrait-oriented image. When the next still image is described in the list of the portrait-oriented image (YES in step S617), in step S623, the control unit 204 reads the next still image from the recording medium M after the passage of a predetermined time, and displays the read still image on the display unit 208. In step S617, the control unit 204 displays the slide show to the last still image described in the list of the portrait-oriented images.

In step S618, the control unit 204 determines whether or not the list is switched to that having the next shooting date. When the list is not switched to that having the next shooting date (NO in step S618), in step S619, the control unit 204 determines whether or not the memory 210 stores the list of the landscape-oriented images having the same shooting date. When the memory 210 does not store the list of the landscape-oriented images having the same shooting date (NO in step S619), in step S620, the control unit 204 determines the next shooting date. In step S621, the control unit 204 determines whether or not the memory 210 stores the list of the portrait-oriented images having the next shooting date.

When the memory 210 stores the list of the landscape-oriented images having the next shooting date (YES in step S621), the processing returns to step S616, and the control unit 204 reads and displays the head image in the list of the landscape-oriented images having the next shooting date. When the memory 210 does not store the list of the landscape-oriented images (NO in step S619) or when the memory 210 does not store the list of the portrait-oriented images having the next shooting date (NO in step S621), in step S622, the display control unit 207 displays warning information for changing the display image to be portrait-oriented on the display unit 208. The, the processing proceeds to step S605, and the above-described processing is repeated.

When the shooting date is switched (YES in step S607), in step S613, the control unit 204 determines the next shooting date. In step S614, the control unit 204 determines whether or not the memory 210 stores the list of the portrait-oriented images having the next shooting date. When the memory 210 stores the list of the portrait-oriented images having the next shooting date (YES in step S614), in step S611, the display control unit 207 displays warning information for changing the display image to be portrait-oriented on the display unit 208. Then, the processing proceeds to step S616, and the above-described processing is repeated. When the memory 210 does not store the list of the portrait-oriented images having the next shooting date (NO in step S614), the processing proceeds to step S616, and the above processing is repeated.

When the shooting date is switched (YES in step S618), in step S624, the control unit 204 designates the next shooting date. In step S625, the control unit 204 determines whether or not the memory 210 stores the list of the landscape-oriented images having the next shooting date.

When the memory 210 stores the list of the landscape-oriented images having the next shooting date (YES in step S625), in step S622, the display control unit 207 displays warning information for changing the display image to be landscape-oriented on the display unit 208. Then, the processing proceeds to step S605, and the above processing is repeated. When the memory 210 does not store the list of the landscape-oriented images having the next shooting date (NO in step S625), the processing proceeds to step S616, and the above processing is repeated.

When the camera 100 is not in the landscape orientation (NO in step S603), in step S615, the control unit 204 determines whether or not the memory 210 stores the list of the portrait-oriented images having the designated shooting date. When the memory 210 stores the list of the portrait-oriented images (YES in step S615), the processing proceeds to step S616, and the above-described processing is repeated.

When the memory 210 does not store the list of the portrait-oriented images (NO in step S615), the processing proceeds to step S605, and the above processing is repeated. When the memory 210 does not store the list of the landscape-oriented images (NO in step S604), the processing proceeds to step S616, and the above-described processing is repeated.

A still image group 903 in FIG. 9 illustrates the still images displayed when the slide show with the switching according to the shooting date is reproduced. When the reproduction of the slide show with the switching according to the shooting date is started, the still images are reproduced in the order illustrated in the lists 803a to 803d in FIG. 8.

When the reproduction is started, May 1st is designated as the shooting date and the camera 100 is landscape-oriented, as illustrated by the still image group 903, the landscape-oriented images are first consecutively reproduced in order of still images 1 to 3 and 5 according to the list 803a. Thereafter, according to the list 803b, the portrait-oriented images are consecutively reproduced in order of still images 4, 6, and 7.

Next, May 2nd is determined as the shooting date. According to the list 803c, the landscape-oriented images are first consecutively reproduced in order of still images 8 and 9. Thereafter, according to the list 803b, the still image 10 is reproduced. At switching timings 903a and 903b of the landscape-oriented image and the portrait-oriented image during reproducing the slide show, the display control unit 207 displays warning information indicating the change in orientation of the image for a predetermined period.

When the slide show with the switching according to the shooting date is reproduced, the recorded still images are classified based on the shooting date. A plurality of still images having the same shooting date is rearranged for each orientation, and only the landscape-oriented images or the portrait-oriented images are consecutively reproduced. Therefore, even if displaying the still image without rotating the portrait orientation thereof, the user may not need to frequently change the orientation of the camera 100.

Depending on the orientation of the camera 100 at the start time for reproducing the slide show, the control unit 204 switches the first reproduction of the landscape-oriented image or the portrait-oriented image. Therefore, the user can change the orientation of the camera 100 at the timing for changing the orientation of the display image.

Figure 7:
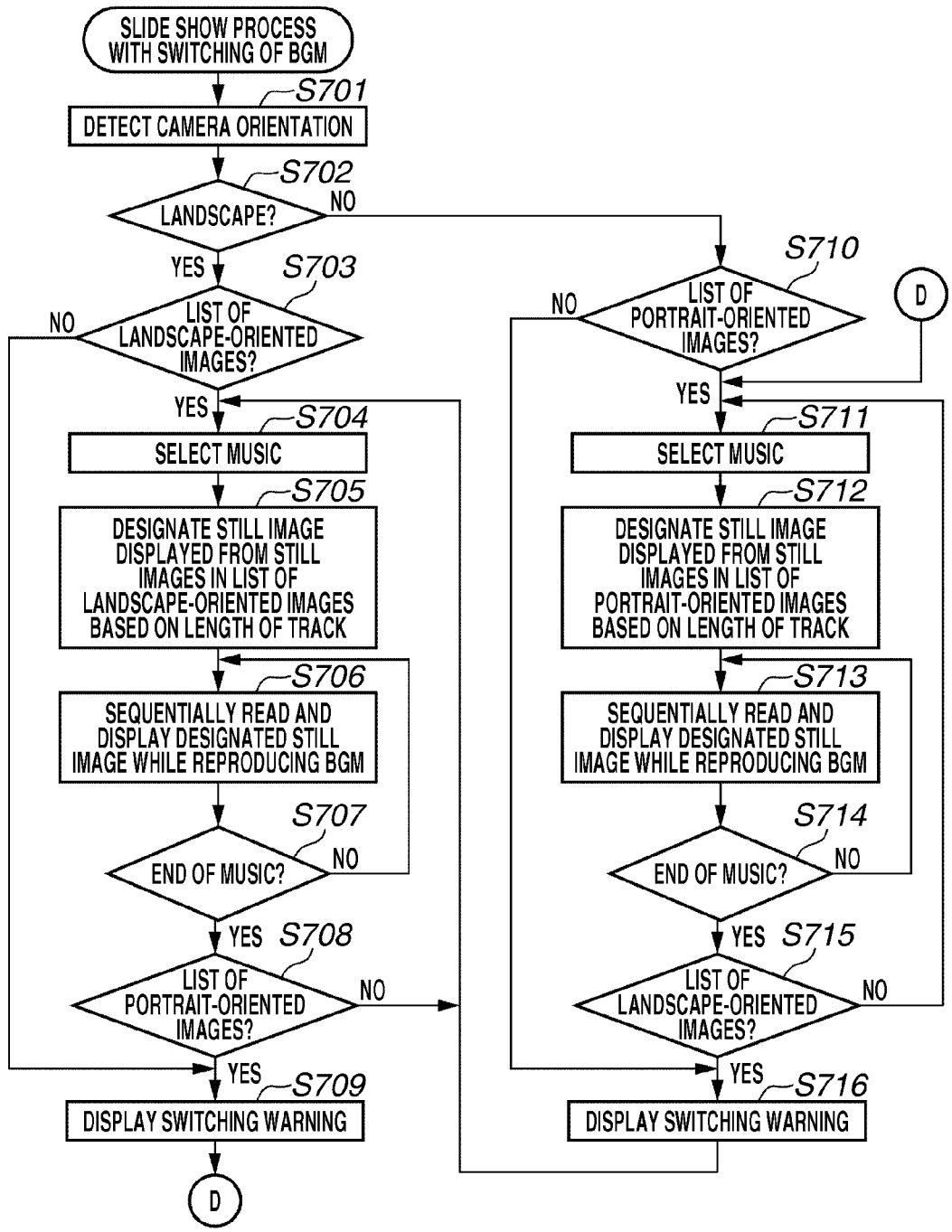
FIG. 7 is a flowchart illustrating a process of the slide show with switching of BGM.

Next, the process of the slide show with the switching of the BGM in step S408 is described. FIG. 7 is a flowchart illustrating the process of the slide show with the switching of the BGM. During the process in FIG. 7, when the user issues an instruction for ending the process of the slide show with the operation unit 206, the control unit 204 ends the process.

According to the exemplary embodiment, a plurality of music data is recorded on the recording medium M to reproduce the music data as the BGM in the slide show. When the slide show is reproduced, the user issues an instruction for reproducing the slide show with the BGM, the control unit 204 reproduces the music data recorded on the recording medium M in predetermined order, and outputs the music data as the BGM while displaying the still image.

In the slide show with the switching of the BGM, the music data is similarly reproduced in the predetermined order. The user can arbitrarily change the reproduction order of the BGM. In the slide show with the switching of the BGM, at the timing for changing music to be reproduced as the BGM, the control unit 204 switches the display of the list of the landscape-oriented images and the display of the list of the portrait-oriented images.

In step S701, the control unit 204 detects the orientation of the camera 100 based on the output from the gravity sensor 209. In step S702, the control unit 204 determines whether or not the camera 100 is in the landscape orientation. When the camera 100 is in the landscape orientation (YES in step S702), in step S703, the control unit 204 determines whether or not the memory 210 stores the list of the landscape-oriented images.

When the memory 210 stores the list of the landscape-oriented images (YES in step S703), in step S704, the control unit 204 selects one piece of music of a plurality of music data recorded to the recording medium M. In step S705, the control unit 204 determines the still image for display in the list of the landscape-oriented images based on the length of the selected track.

According to the exemplary embodiment, the recording medium M records information on the length of the piece of music for each music of the music data. The control unit 204 detects the length (reproduction time) of the selected piece of music based on the information on the length of the piece of music. Specifically, the control unit 204 determines a number n of the still images for display within a reproduction period of the selected piece of music based on the detected length of the piece of music and the display time for one still image during the reproduction of the slide show.

The control unit 204 selects the n still images as n screens for display within the reproduction period of the piece of music starting from the head of the list of the landscape-oriented images stored in the memory 210. When the reproduction time of the BGM is 1 minute and the display time for one still image is 5 seconds, the control unit 204 selects twelve still images starting from the head of the list of the landscape-oriented images.

In step S706, the control unit 204 sequentially reproduces and displays the selected still images in the order of the list, and reproduces and outputs the music data of the selected music. When the reproduction time of all still images described in the list of the landscape-oriented images is shorter than the length of the selected music, the control unit 204 determines that the same still image is repeatedly reproduced.

In step S707, the control unit 204 determines whether or not the currently-reproduced music ends. The control unit 204 reproduces and displays the still images in the landscape orientation according to the list until ending of the music. When the music ends (YES in step S707), in step S708, the control unit 204 determines whether or not the memory 210 stores the list of the portrait-oriented images. When the memory 210 does not store the list of the portrait-oriented images (NO in step S708), the processing returns to step S704, and the above processing is repeated.

When the memory 210 stores the list of the portrait-oriented images (YES in step S703), in step S709, the display control unit 207 displays warning information for changing the display image to be portrait-oriented on the display unit 208. In step S711, the control unit 204 selects the next piece of music as the BGM.

In step S712, the control unit 204 selects the still image for display in the list of the portrait-oriented images stored in the memory 210 based on the length of the selected track this time. Similarly to step S705, the control unit 204 determines the number n of the still images for display within the reproduction period of the selected music based on the length of the detected music and the display time for each still image during reproduction of the slide show.

The control unit 204 selects the n still images as n screens for display within the reproduction period of the music, starting from the head of the list of the portrait-oriented images stored in the memory 210. In step S713, the control unit 204 sequentially reproduces and displays the selected still image in the order of the list, and reproduces and outputs the music data of the selected music.

When ending the track that is being reproduced (YES in step S714), in step S715, the control unit 204 determines whether or not the memory 210 stores the list of the landscape-oriented images. When the memory 210 does not store the list of the landscape-oriented images (NO in step S715), the processing returns to step S711, and the above-described processing is repeated.

When the memory 210 stores the list of the landscape-oriented images (YES in step S715), in step S716, the display control unit 207 displays warning information for changing the display image to be landscape-oriented on the display unit 208. The processing proceeds to step S704, and the above processing is repeated.

When the camera 100 is not in the landscape orientation (NO in step S702), in step S710, the control unit 204 determines whether or not the memory 210 stores the list of the portrait-oriented images. When the memory 210 stores the list of the portrait-oriented images (YES in step S710), the processing proceeds to step S711, and the above processing is repeated.

When the memory 210 does not store the list of the portrait-oriented images (NO in step S710), in step S716, the display control unit 207 displays warning information for changing the display image to be landscape-oriented on the display unit 208. The processing proceeds to step S704, and the above processing is repeated.

In steps S705 and S712, when the music to be reproduced next is the third or subsequent piece of music, the control unit 204 may select a number of the still images corresponding to the length of the music from the still images other than the reproduced still images in the list of the landscape-oriented images or the list of the portrait-oriented images, in the order of the list. When the last image in the list is displayed in the middle of the music, the control unit 204 may similarly select the still image for display in the list starting from the head still image.

FIG. 10 illustrates a state of the image displayed in the slide show with the switching of the BGM. In FIG. 10, the images illustrated on the left are displayed first, including landscape-oriented images 1005 and 1007 and portrait-oriented images 1006 and 1008, within reproduction periods 1001 to 1004 corresponding to first- to fourth pieces of BGM.

The recording medium M records the landscape-oriented still images 1005 and 1007 and the portrait-oriented still images 1006 and 1008. At the reproduction time of the normal slide show, the landscape-oriented still images and the portrait-oriented still images are mixedly displayed in order of the shooting date.

In the slide show with the switching of the BGM, as illustrated in FIG. 10, the images are classified into the landscape-oriented images and the portrait-oriented images according to the length of music, and are consecutively reproduced. Therefore, even when the portrait-oriented image is displayed without rotating the orientation thereof, the user may not need to frequently change the orientation of the camera 100.

According to the present exemplary embodiment, when a plurality of still images recorded on the recording medium M is reproduced in the slide show, the still images are classified depending on the orientation of the image. The still images in the same orientation are consecutively reproduced. Therefore, even if displaying the portrait-oriented image without rotating the orientation thereof, the user may not need to frequency change the orientation of the camera 100.

Further, depending on the orientation of the camera 100 at the start time for reproducing the slide show, it is switched whether the landscape-oriented image or the portrait-oriented image is first reproduced. Therefore, the user can change the orientation of the camera 100 at the timing for changing the orientation of the display image.

According to the present exemplary embodiment, the case is described in which the present invention is applied to the camera that captures the still image and records the captured still image to the recording medium. In addition, the present invention can be applied to a display apparatus that reproduces and displays the still image. For example, with a display apparatus, additional information recorded together with a still image file can be reproduced from a recording medium such as a memory card, and the orientation of the image can be detected based on the additional information. Similar to the exemplary embodiment, at the reproduction time of the slide show, a plurality of images are classified depending on the orientation thereof, and the display order is changed.

With the display apparatuses, a mechanism for automatically moving the orientation of the display unit may be provided to change the orientation of the display unit according to the orientation of the display image in the reproduction in the slide show illustrated in FIGS. 5 to 7.

According to the present exemplary embodiment, the list illustrated in FIG. 8 is generated for each of the shooting date based on the additional information of the still image file. In addition, another condition such as the shooting place may be detected based on the additional information to generate the list. For example, information on the shooting place may be detected, and a plurality of still images captured at a place (within an area) may be classified into the landscape-oriented image and the portrait-oriented image to generate the list.

Further, a slide show mode may be provided to consecutively reproduce the landscape-oriented image and the portrait-oriented image for each of images captured at the same place.

With the camera 100 illustrated in FIG. 1, the image is recorded to a loadable/ejectable recording medium such as a memory card and is reproduced. Alternatively, a recording medium with a large capacity may be built in a camera body, and the image may be recorded on the built-in recording medium, and may be reproduced.

According to the present exemplary embodiment, the control unit 204 reads and executes a program code of a computer executable program for realizing the functions of the processes from a memory (e.g., the memory 210), thereby realizing the functions of the processes illustrated in FIGS. 3 to 7.

A computer-readable recording medium may record a computer-executable program for realizing the functions of the processes illustrated in FIGS. 3 to 7, and the control unit 204 may read and execute the program recorded to the recording medium, thereby performing the processes.

The "computer-readable recording medium" includes not only a movable medium such as a flexible disk, a magneto-optical disk, a ROM, or a CD-ROM, and a storage device such as a hard disk included in a computer system, but also a memory in a computer system as a server or a client upon transmitting the program via a network such as the Internet or a communication line such as a telephone line.

The transmitted program may realize a part of the functions. Alternatively, the program may realize the functions thereof with combination with the program already-recorded to the memory, i.e., differential file (differential program).

A program product such as the computer-readable recording medium that records the program can be applied as an exemplary embodiment of the present invention. The present invention includes the program, recording medium, transmission medium, and program product.

The present invention is described according to the exemplary embodiment. The present invention is not limited to the exemplary embodiment, and can be modified within the range of Claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-183331 filed Aug. 6, 2009 and No. 2010-156813 filed Jul. 9, 2010, which are hereby incorporated by reference herein in their entirety.

What is claimed is:

1. An apparatus comprising:
   a display unit;
   a detection unit configured to detect whether the apparatus is in a landscape orientation or in a portrait orientation; and
   a control unit configured to display a plurality of images in accordance with a detection result of the detection unit, wherein the control unit has a first mode in which the control unit displays a plurality of images in one orientation of a landscape-oriented image and a portrait-oriented image on the display unit in response to an instruction, and thereafter displays a plurality of images in the other orientation on the display unit and a second mode in which the control unit displays the plurality of images in a predetermined order different from a display order of the plurality of images in the first mode, wherein in the first mode, the control unit determines an orientation of an image to be displayed first based on an orientation of the apparatus detected by the detection unit when the control unit receives the instruction, wherein in the first mode, the control unit displays the image without changing the image in orientation, and in the second mode, the control unit displays the portrait-oriented image with change in orientation when the apparatus is in the landscape orientation, and further displays the landscape-oriented image with change in orientation when the apparatus is in the portrait orientation.

2. The apparatus according to claim 1, wherein, in the first mode, if the apparatus is in the landscape orientation when the control unit receives the instruction, the control unit first displays the plurality of landscape-oriented images and thereafter displays the plurality of portrait-oriented images on the display unit.

3. The apparatus according to claim 1, wherein, in the first mode, if the apparatus is in the portrait orientation when the control unit receives the instruction, the control unit displays the plurality of the portrait-oriented images first, and thereafter displays the plurality of the landscape-oriented images on the display unit.

4. The apparatus according to claim 1, wherein, in the first mode, the control unit displays information indicating a change in orientation of the image displayed on the display unit between the image in the one orientation and the image in the other orientation.

5. The apparatus according to claim 4, wherein the control unit does not display the image in the other orientation, until a change in orientation of the apparatus is detected by the detection unit after displaying information indicating the change in orientation of the image.

6. The apparatus according to claim 1, further comprising:
a classification unit configured to classify a plurality of images into a landscape-oriented image and a portrait-oriented image and generate a list of images in the landscape orientation indicating the landscape-oriented images and a list of images in the portrait orientation indicating the portrait-oriented images,
wherein the control unit determines the display order of the plurality of images in the first mode based on the lists.

7. The apparatus according to claim 6, wherein the classification unit classifies the landscape-oriented image and the portrait-oriented image based on additional information on the plurality of images.

8. The apparatus according to claim 1, further comprising:
a reproduction unit configured to reproduce the image from a recording medium that records a plurality of the images,
wherein the control unit displays the reproduced image on the display unit.

9. An apparatus comprising:
a display unit;
a classification unit configured to classify a plurality of images into a landscape-oriented image and a portrait-oriented image;

a detection unit configured to detect whether the apparatus is in a landscape orientation or in a portrait orientation; and
a control unit configured to display a plurality of images on the display unit,
wherein the control unit has a first mode for displaying a plurality of images in one orientation of the landscape-oriented image and the portrait-oriented image on the display unit in response to an instruction, and thereafter display a plurality of images in the other orientation on the display unit, and a second mode for displaying the plurality of images in a predetermined order different from a classification result,
wherein in the first mode, the control unit determines the orientation of the image to be displayed first based on a detection result when the control unit receives the instruction, and
wherein in the first mode, the control unit displays the image without changing the image in orientation and, in the second mode, the control unit displays the portrait-oriented image with change in orientation when the apparatus is in the landscape orientation, and further displays the landscape-oriented image with change in orientation when the apparatus is in the portrait orientation.

10. An apparatus comprising:
a display unit;
a control unit configured to display a plurality of images on the display unit,
wherein the control unit has a first mode in which the control unit displays a plurality of images in one orientation of a landscape-oriented image and a portrait-oriented image on the display unit, and thereafter displays a plurality of images in the other orientation on the display unit and a second mode in which the control unit displays a plurality of images on the display unit in an order of shooting the plurality of images,
wherein, in the first mode, the control unit determines an orientation of an image to be displayed first based on an orientation of the apparatus at a display start time, and
wherein in the first mode, the control unit displays the image without changing the image in orientation, and in the second mode the control unit displays the portrait-oriented image with change in orientation when the apparatus is in the landscape orientation, and further displays the landscape-oriented image with changing the image in orientation when the apparatus is in the portrait orientation.

11. The apparatus according to claim 10, further comprising:
a classification unit classifies a plurality of images recorded on a recording medium into the landscape-oriented images and the portrait-oriented images,
wherein the display unit displays the image recorded on the recording medium.

12. The apparatus according to claim 11, wherein, if the landscape-oriented image is not recorded on the recording medium, the control unit displays the portrait-oriented image recorded on the recording medium on the display unit, and if the portrait-oriented image is not recorded in the recording medium, the control unit displays the landscape-oriented image recorded on the recording medium on the display unit.

13. An apparatus comprising:
a display unit;
a classification unit configured to classify a plurality of images into a landscape-oriented images and a portrait-oriented images; and a control unit configured to display a plurality of images on the display unit, wherein the control unit has a first mode for displaying a plurality of images in one orientation of the landscape-oriented image and the portrait-oriented image on the display unit, and thereafter displays a plurality of images in the other orientation on the display unit, and second mode for displaying the plurality of images in a predetermined order different from a classification result, wherein in the first mode, if the apparatus is in a landscape orientation at a display start time, the control unit first displays the plurality of the landscape-oriented images on the display unit, and thereafter displays the plurality of the portrait-oriented images on the display unit, and if the apparatus is in a portrait orientation at the display start time, the control unit first displays the plurality of the portrait-oriented images on the display unit, and thereafter displays the plurality of the landscape-oriented images on the display unit, wherein, in the first mode, the control unit displays the image without changing the image in orientation, and in the second mode, the control unit displays the portrait-oriented image with change in orientation if the apparatus is in the landscape orientation, and further displays the landscape-oriented image with change in orientation if the apparatus is in the portrait orientation.

14. A method for controlling a display apparatus, the method comprising:

a displaying step that displays a plurality of images on the display apparatus, wherein the display step has a first mode in which a plurality of images in one orientation of a landscape-oriented image and a portrait-oriented image corresponding to an orientation of the display apparatus are displayed, and thereafter a plurality of images in the other orientation are displayed and a second mode in which a plurality of images are displayed in a predetermined order different from a display order of the plurality of images in the first mode, wherein in the first mode, the display step determines an orientation of an image to be displayed first based on a detection result when the display step receives an instruction, wherein in the first mode, the display step displays the image without changing the image in orientation, and in the second mode, the display step displays the portrait-oriented image with change in orientation when the display apparatus is in the landscape orientation, and further displays the landscape-oriented image with change in orientation when the display apparatus is in the portrait orientation.

15. The method according to claim 14, wherein, in the first mode, the display step displays information indicating a change in orientation of the displayed image between the image in the one orientation and the image in the other orientation.

16. The method according to claim 14, further comprising:

a classification step that classifies a plurality of images into a landscape-oriented images and a portrait-oriented images and generates a list of images in the landscape orientation indicating the landscape-oriented images and a list of images in the portrait orientation indicating the portrait-oriented images, wherein the display step determines the display order of the plurality of images in the first mode based on the lists.

17. The method according to claim 14, further comprising:

a reproducing step that reproduces the image from a recording medium, wherein the control step displays the reproduced image.

18. A method for controlling a display apparatus, the method comprising:

a detecting step that detects whether the display apparatus is in a landscape orientation or in a portrait orientation;

a control step that displays a plurality of images on the display apparatus in accordance with a detection result of the detection step, wherein the control step has a first mode in which a plurality of images in one orientation of a landscape-oriented image and a portrait-oriented image are displayed, and thereafter a plurality of images in the other orientation are displayed, and a second mode in which the plurality of images are displayed in an order of shooting the plurality of images, wherein in the first mode, the control step determines an orientation of an image to be displayed first based on an orientation of the display apparatus at a display start time, and wherein, in the first mode, the control step displays the image without changing the image in orientation, and in the second mode, the control step displays the portrait-oriented image with change in orientation if the display apparatus is in the landscape orientation, and displays the landscape-oriented image with change in orientation if the display apparatus is in the portrait orientation.

* * * * *